United States Patent
Hosier et al.

(10) Patent No.: US 6,670,598 B1
(45) Date of Patent: Dec. 30, 2003

(54) LOW POWER AUTOZERO OF PIXEL AMPLIFIER

(75) Inventors: Paul A. Hosier, Rochester, NY (US); Scott L. TeWinkle, Ontario, NY (US)

(73) Assignee: Xerox Corporation, Stamford, CT (US)

( * ) Notice: Subject to any disclaimer, the term of this patent is extended or adjusted under 35 U.S.C. 154(b) by 659 days.

(21) Appl. No.: 09/656,469

(22) Filed: Sep. 6, 2000

(51) Int. Cl.[7] ............................................... H01J 40/14
(52) U.S. Cl. ............................... 250/214 A; 250/208.1
(58) Field of Search ........................ 250/214 A, 208.1; 330/250; 327/63, 65, 78, 91; 348/241, 243, 250, 294, 301, 311

(56) References Cited

U.S. PATENT DOCUMENTS

| | | | |
|---|---|---|---|
| 4,737,854 A | 4/1988 | Tandon et al. | 358/213.31 |
| 4,814,296 A | 3/1989 | Jedlicka et al. | 437/226 |
| 5,081,536 A | 1/1992 | Tandon et al. | 358/213.31 |
| 5,105,277 A | 4/1992 | Hayes et al. | 358/213.31 |
| 5,153,421 A | 10/1992 | Tandon et al. | 250/208.1 |
| 5,340,619 A | 8/1994 | Chen et al. | 424/498 |
| 5,473,513 A | 12/1995 | Quinn | 361/760 |
| 5,493,423 A | 2/1996 | Hosier | 358/482 |
| 5,521,125 A | 5/1996 | Ormond et al. | 437/227 |
| 5,604,362 A | 2/1997 | Jedlicka et al. | 257/233 |
| 5,638,121 A | 6/1997 | Hosier et al. | 348/312 |
| 5,848,331 A | 12/1998 | Fromm | 399/122 |

OTHER PUBLICATIONS

Application Ser. No. 09/196,462, filed Nov. 19, 1998, entitled: Electro Optical Devices with Reduced Filter Thinning on the Edge Pixel Photosites and Method of Producing Same Now, Patent No. 6,201,293.
Application Ser. No. 09/389,622, filed Sep. 3, 1999, entitled: Resettable Pixel Amplifier for Use in a Photosensor Array.
Application Ser. No. 09/428,615, filed Oct. 27, 1999, entitled: Toner Concentration Control for an Imaging System Now, Patent No. 6,175,698.

*Primary Examiner*—Kevin Pyo
*Assistant Examiner*—Seung C. Sohn
(74) *Attorney, Agent, or Firm*—P. Daebeler

(57) ABSTRACT

The present invention generally relates to a photosensor array including a plurality of photosites; an amplifier associated with each photosite and including a plurality of transistors, wherein the amplifier includes autozeroing transistors for autozeroing at low power to remove voltage offsets in the amplifier; a transfer circuit associated with each photosite for transferring a charge on the photosite to a reset node interposed between the photosite and amplifier.

12 Claims, 12 Drawing Sheets

LOW POWER AUTOZERO OF PIXEL AMPLIFIER

FIELD OF THE INVENTION

The present invention generally relates to providing a low power autozero capability for a pixel amplifier to remove noise in the information collected by image sensors, which are commonly found in digital scanners, copiers, facsimile machines, or other document generating or reproducing device. More specifically, the present invention removes amplifier offset without dramatically increasing chip power and without slowing down the pixel read out rate to provide a clear readout free of the noise. The present invention is particularly applicable to color input imaging devices or systems.

BACKGROUND OF THE INVENTION

The present application incorporates by reference U.S. Pat. Nos. 5,081,536 and 5,493,423.

Image sensor arrays typically comprise a linear array of photosensors which raster scan an image bearing document and convert the microscopic image areas viewed by each photosensor to image signal charges. Following an integration period, the image signal charges are amplified and transferred as an analog video signal to a common output line or bus through successively actuated multiplexing transistors. One example of such an array is a charged-coupled device (CCD).

For high-performance image sensor arrays, a preferred design includes an array of photosensors of a width comparable to the width of a page being scanned, to permit one-to-one imaging generally without the use of reductive optics. In order to provide such a "full-width" array, however, relatively large silicon structures must be used to define the large number of photosensors. A preferred technique to create such a large array is to align several butted silicon chips, each chip defining a small linear array thereon. The term "butted" in this application refers to both "butted" and "near butted."

The silicon chips which are butted to form a single full-width array are typically created by first creating the circuitry for a plurality of individual chips on a single silicon wafer. The silicon wafer is then cut or "diced," around the circuit areas to yield discrete chips. Typically, the technique for dicing the chips includes a combination of chemical etching and mechanical sawing. On each chip, the photosensors are spaced with high resolution from one end of a chip to the other; the length of each diced chip from one end of the array thereon to the other requires precision dicing. It would be desirable to dice each individual chip with a precise dimension along the linear array of photosensors, so that, when a series of chips are butted end-to-end to form a single page-width linear array, there is a minimum disruption of spacing from an end photosensor on one chip to a neighboring photosensor at the end of a neighboring chip. Ideally, the spacing, or pitch, across an entire full-width linear array should be consistent regardless of the configuration of silicon chips forming the array.

Preferably, the full-width array extends the entire length of a document, such as eleven inches. Usually, the full-width array is used to scan line by line across the width of a document with the document being moved or stepped lengthwise in synchronism therewith. A typical architecture for such a sensor array is given, for example, in U.S. Pat. No. 5,473,513. When the original document moves past the full-width array, each of the photosensors converts reflected light from the original image into electrical signals. The motion of the original image perpendicular to the linear array causes a sequence of signals to be output from each photosensor, which can be converted into digital data.

With the gradual introduction of color-capable products into the office equipment market, it has become desirable to provide scanning systems which are capable of converting light from full-color images into separate trains of image signals, each train representing one primary color. In order to obtain the separate signals relating to color separations in a full-color image, one technique is to provide on each semiconductor chip multiple parallel linear arrays of photosensors, each of the parallel arrays being sensitive to one primary color. Typically, this arrangement can be achieved by providing multiple linear arrays of photosensors which are physically identical except for a selectively transparent primary-color overlay over the photosensitive areas, or "photosites," for that linear array. In other words, the linear array which is supposed to be sensitive to red light only will have a selectively transparent red layer placed on the photosites thereof, and such would be the case for a blue-sensitive array, a green-sensitive array, or any other color-sensitive array. These selectively transparent layers are also referred to as absorption filter layers, because they selectively adsorb or block light having certain frequencies or wavelengths from reaching the photosensitive areas. Although it is preferable to use three linear arrays, any number of linear arrays can be used. As the chips are exposed to an original full-color image, only those portions of the image, which correspond to particular primary colors, will reach those photosensors assigned to the primary color.

The most common substances for providing these selectively transparent filter layers over the photosites are polyimide or acrylic. For example, polyimide is typically applied in liquid form to a batch of photosensor chips while the chips are still in undiced, wafer form. After the polyimide liquid is applied to the wafer, the wafer is centrifuged to provide an even layer of a particular polyimide. In order to obtain the polyimide having the desired primary-color-filtering properties, it is well known to dope the polyimide with either a pigment or dye of the desired color, and these dopants are readily commercially available. When it is desired to place different kinds of color filters on a single chip, a typical technique is to first apply an even layer of polyimide over the entire main surface of the chip (while the chip is still part of the wafer) and then remove the unnecessary parts of the filter by photo-etching or another well known technique. Typically, the entire filter layer placed over the chip is removed except for those areas over the desired set of photosites. Acrylic is applied to the wafer in a similar manner. After the chips are mounted to a substrate as taught in U.S. Pat. No. 5,473,513, a glass cover is placed over the chips and mounted on the substrate to provide physical protection of the chips.

As indicated above, image sensor arrays typically comprise at least one linear array of photosites which scan an image bearing document and convert the microscopic image areas viewed by each photosite to image signal charges. Following an integration period, the image signal charges are amplified and transferred to a common output line or bus through successively actuated multiplexing transistors.

In the scanning process, bias and reset charges are applied to each photosite cell in a predetermined time sequence during each scan cycle. Where a two stage transfer circuit is provided with each cell for transferring the image signal charges from the photosites, the bias charge is applied to each photosite through a bias charge injection transistor coupled to a node between the photosite and the input to the two stage transfer circuit. However, even if the transistors between the photodiode in the photosite and its associated amplifier are reset with each scan cycle, the particular amplifier associated with the photosite, which includes any number of transistors within it, is not always similarly reset. The transistors within the amplifier may retain residual charges thereon between scan cycles, and the cumulative effect of these residual charges remaining within the amplifier could be a source of noise on the output signals coming out of the amplifiers. It is therefore desirable to provide a system in which not only are the transistors between the photodiode and the amplifier reset, but wherein the transistors within the amplifier itself are periodically reset to retain charges between each scan cycle of known value. In this way circuit elements particularly transistors, within each amplifier will start from known states with every scan cycle, and the amplifier itself will not become a source of noise. This is intended to provide uniformity by causing critical nodes within the amplifier associated with the sensor to settle to known charge values or known voltage after each signal is passed through.

However, there is a problem with the prior art in that the prior art does not reset all of the circuit elements including the transistors in the amplifier itself at the same time, in addition, the voltage level has several components in it, including at least the signal voltage (based on image information from the photosite) and a dark offset voltage, or nominal starting operating voltage. The problem is that this voltage level may also contain some dark nonuniformity, or fixed pattern noise, from pixel to pixel, if the voltage buffering in the two stage transfer circuit and amplifier are done on a per pixel basis as is often done in CMOS sensors. Fixed pattern noise is caused by random process variations from pixel to pixel.

In order to solve this problem and enhance image quality, Correlated Double Sampling (CDS) or Double Sampling (DS) can be used to remove this fixed pattern noise, especially during the relative long row readout time on area image sensors. If maximum speed is not needed, DS can also be done at the pixel readout rate on linear sensors with a 2×impact on readout time. However, this is very time consuming. Therefore, there is a need to provide a method and apparatus to reset the circuit elements at the same time and to eliminate the noise caused by the dark offset voltage.

SUMMARY OF THE INVENTION

According to one embodiment of the present invention, there is provided a photosensor array including a plurality of photosites, wherein an amplifier is associated with each photosite and each amplifier includes a plurality of transistors. Each amplifier includes autozeroing transistors for autozeroing at low power to remove voltage offsets in the amplifier. A transfer circuit is associated with each photosite for transferring a charge on the photosite to a reset node interposed between the photosite and amplifier. The photosites in the photosensor array may be photodiodes. The photosensor array may include a linear array of photosites or multiple parallel linear arrays of photosites. The amplifier includes a differential pair of transistors and a matched load pair of transistors, wherein the differential pair of transistors and the matched load of transistors operate at the same $V_{GSN}-V_{TN}$. The amplifier includes a dummy transistor associated with the autozeroing transistors, wherein the dummy transistor compensates the autozeroing transistors. The amplifier is autozeroed during a reset time. The transistors of the amplifier comprise one of CMOS or Bipolar. The photosensor array further comprises means for selectively causing the amplifier to output a charge from the reset node as an output signal.

A digital imaging system for generating an image from output image signals comprising: a photoreceptor; a plurality of charging units charging the photoreceptor; a plurality of exposure units receiving the image signals and exposing the photoreceptor to place a latent image on the photoreceptor based on the image signals; a scanner for scanning the images, generating the output image signals and transmitting the output image signals to the exposure units, wherein the scanner includes a photosensor array having a plurality of photosites, each photosite being associated with an amplifier, which includes autozeroing transistors for autozeroing at low power to remove voltage offsets in the amplifier; each photosite being associated with a transfer circuit for transferring a charge on the photosite to a reset node interposed between the photosite and amplifier; and each photosite being associated with a means for selectively causing the amplifier to output a charge from the reset node as output image signals; a plurality of developer structures, each developer structure being connected to a corresponding dispenser, each dispenser having a different toner, and each developer structure applying toner to the photoreceptor; a transfer unit transferring the toner on the photoreceptor to a support material; a fusing unit fusing the toner to the support material; and a cleaner cleaning the photoreceptor after the support material has passed through the transfer unit. The photosites are photodiodes.

A method of operating an amplifier at low power mode for removing voltage offsets in the amplifier, comprising the steps of: applying a reference voltage to the input node of the amplifier to prepare the amplifier for voltage offset removal; selecting the low power mode; autozeroing the amplifier at low power mode by selecting the autozero clock; deselecting the autozero clock while the reference voltage is still at the input node and the amplifier is in the low power mode; applying a signal to the input node of the amplifier; and selecting the high power mode of the amplifier and read out the signal without voltage offset.

DESCRIPTION OF THE PREFERRED EMBODIMENTS

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined in the appended claims.

Figure 1:
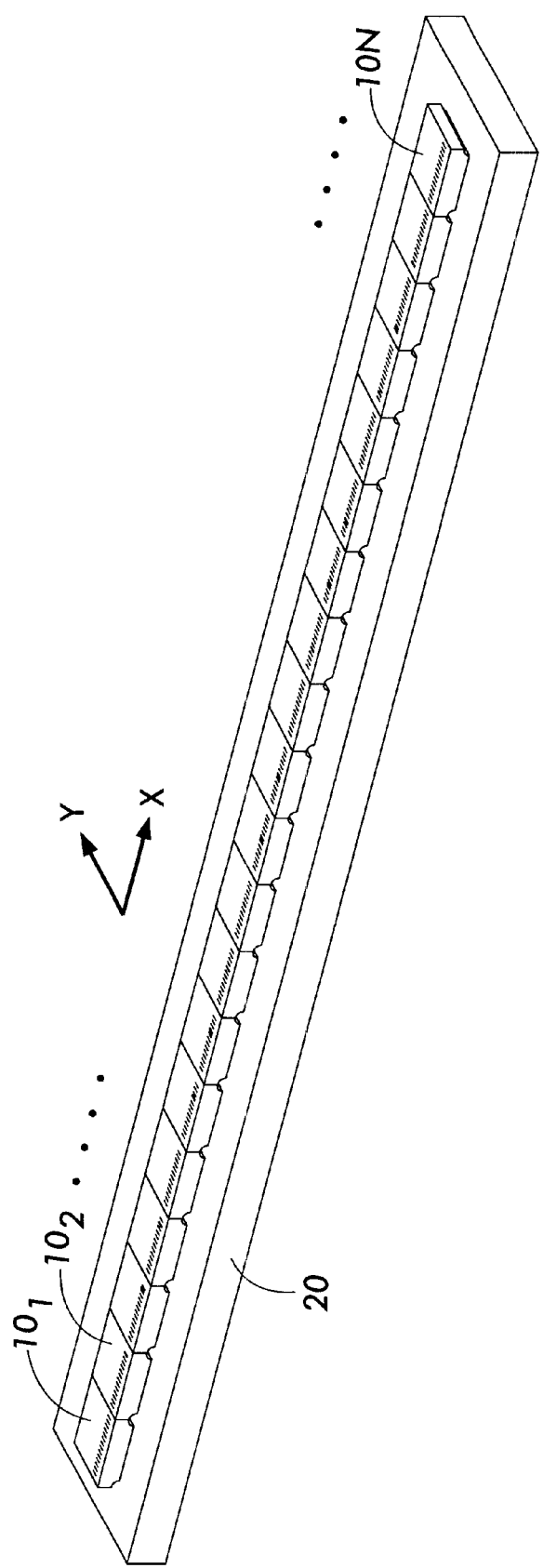
FIG. 1 is a perspective view of a base substrate having a plurality of butted photosensitive chips mounted thereon to form a full width array.

FIG. 1 shows a plurality of photosensitive chips 10 mounted and butted on a substrate 20 from end to end to form an effective collinear array of photosites, which extends across a page image being scanned for a scanner, copier, facsimile machine or other document reading or generating device. Generally, each individual photosite is adapted to output a charge or voltage signal indicative of the intensity of light of a certain type impinging thereon; various structures, such as transfer circuits, or charged coupled devices, are known in the art for processing signal output by the various photosites.

Figure 2:
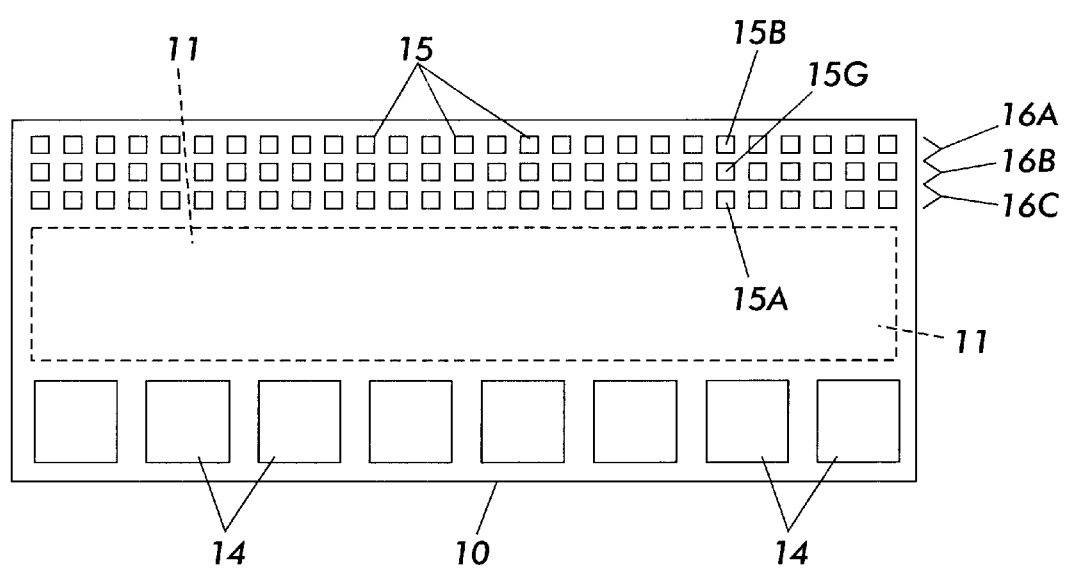
FIG. 2 is a plan view showing a photosensitive chip relevant to the present invention.

FIG. 2 is a plan view showing one of these photosensitive chips 10 relevant to the claimed invention. The photosensitive chip 10 is generally made of a semiconductor substrate, as is known in the art, in which circuitry and other elements are formed, such as by photolithographic etching. A few of the most relevant structures are one or more linear arrays of photosites 15, each of which forms the photosensitive surface of circuitry within the photosensitive chip 10, and a set of bonding pads 14. The photosites 15 are typically arranged in a linear array along one main dimension of the photosensitive chip 10, with each photosites 15 along the array corresponding to one pixel in an image signal. As will be described in detail below, the photosites 15 are preferably for sensing the three primary colors, blue, green and red. Photosites 15, which sense blue, green and red, are referred to as photosites 15B, 15G and 15R. However, the photosite 15 sensing blue, green and red could be replaced with photosites sensing yellow, magenta and cyan, for example. Any other suitable combination of color sensitive photosites may also be used. Each photosite is associated with a corresponding photosensor such as a photodiode. Preferably, there are three parallel linear arrays 16A, 16B, and 16C for the three primary colors.

The bonding pads 14 are distinct surfaces on the main surface of the photosensitive chip 10, and are intended to accept wire bonds attached thereto. The bonding pads 14 thus serve as the electronic interface between the photosensitive chip 10 and any external circuitry. The circuitry for obtaining signals related to light directed to the photosites 15, and for unloading image data from the photosensitive chip 10 is generally indicated as 11. The circuitry 11 is generally deposited between a linear array of photosites 15 and a linear array of bonding pads 14. However, any number of multiple parallel linear arrays may be provided on each photosensitive chip 10.

Figure 3:
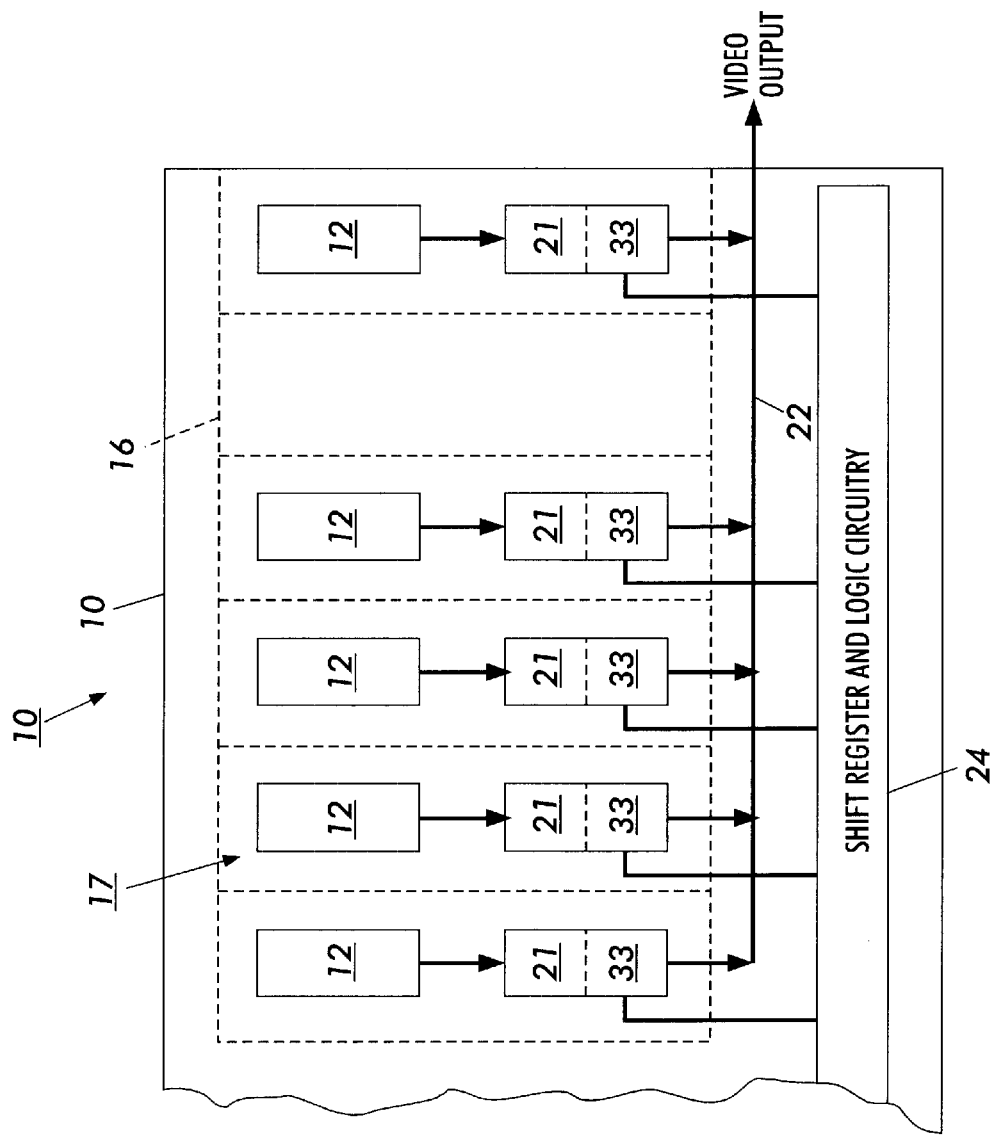
FIG. 3 is a schematic view of an image scanning array having an array of photosite cells, each cell having a photodiode, two stage transfer circuit and amplifier for transferring image signal charges from the photodiodes to a common output bus.

Referring to FIG. 3, there is shown a linear array with two stage transfer. Each linear array 16 shown in FIG. 2 preferably has the same configuration shown in FIG. 3. Each linear array 16 includes a plurality of photosites 15 preferably in the form of photodiodes 12 thereon. Photodiodes 12 are in closely spaced juxtaposition with one another on each chip 10 in a linear array or row 16. As discussed above, the linear array(s) 16 on chips 10 can be abutted together end to end to form a full width array with the spacing between the photodiodes 12 at the butted ends the same as the spacing between the photodiodes 12 inside each chip 10 thereby maintaining photodiode pitch across an entire full width array.

While photodiodes 12 are shown and described herein, other photosite types such as amorphous silicon or transparent electrode MOS type photosites may be envisioned.

Each photodiode 12 has a two stage transfer circuit 21 and amplifier 33 associated therewith which form a photosite cell 17 at the array front end. In each cell 17, the image signal charge from the photodiode 12 is transferred by circuit 21 to amplifier 33 where the image signal charge from photodiode 12 is amplified to bring the image signal charge to a desired potential level prior to transferring the charge to a common video output line or bus 22. Suitable shift register and logic circuitry 24 provide timing control signals $\Phi_{PIXEL}$ for connecting each cell 17 to bus 22 in the proper timed sequence.

Each linear array 16 may for example be used to raster scan a document original, and in that application, the document original and the linear array(s) 16 are moved or stepped relative to one another in a direction (i.e., the slow scan direction) that is normally perpendicular to the linear axis of array 16. At the same time, the array 16 scans the document original line by line in the direction (i.e., the fast scan direction) parallel to the linear axis of the array 16. The image line being scanned is illuminated and focused onto the photodiodes 12. During an integration period, a charge is developed on each photodiode 12 proportional to the reflectance of the image area viewed by each photodiode 12. The image signal charges are thereafter transferred by two stage transfer circuits 21 via amplifier 33 to output bus 22 in a predetermined step by step timed sequence.

In the ensuing description, all transistors shown are N-channel type. However, P-channel transistors may instead be used with appropriate voltage level changes as will be understood.

Figure 4:
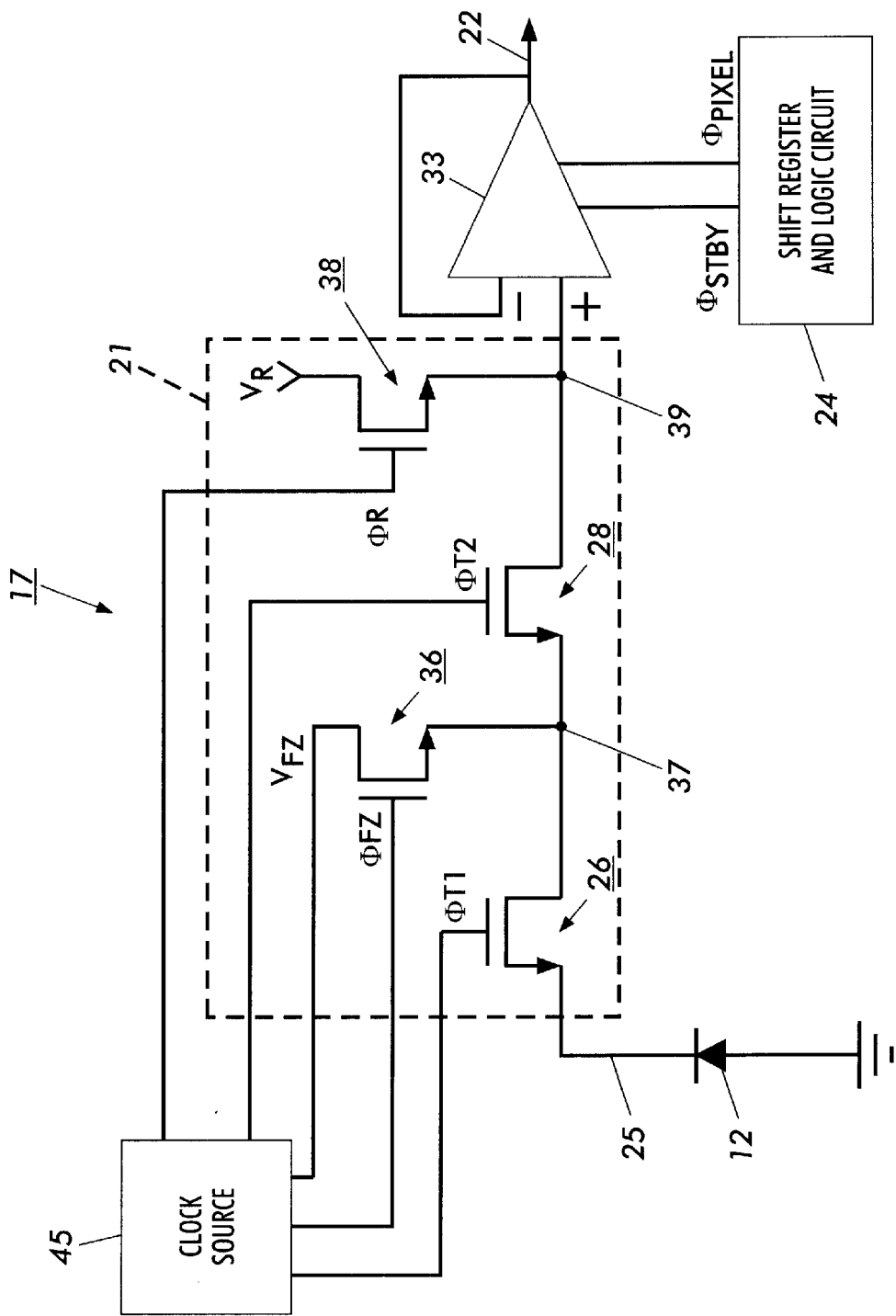
FIG. 4 is a prior art circuit schematic showing a photosite cell.
Figure 5:
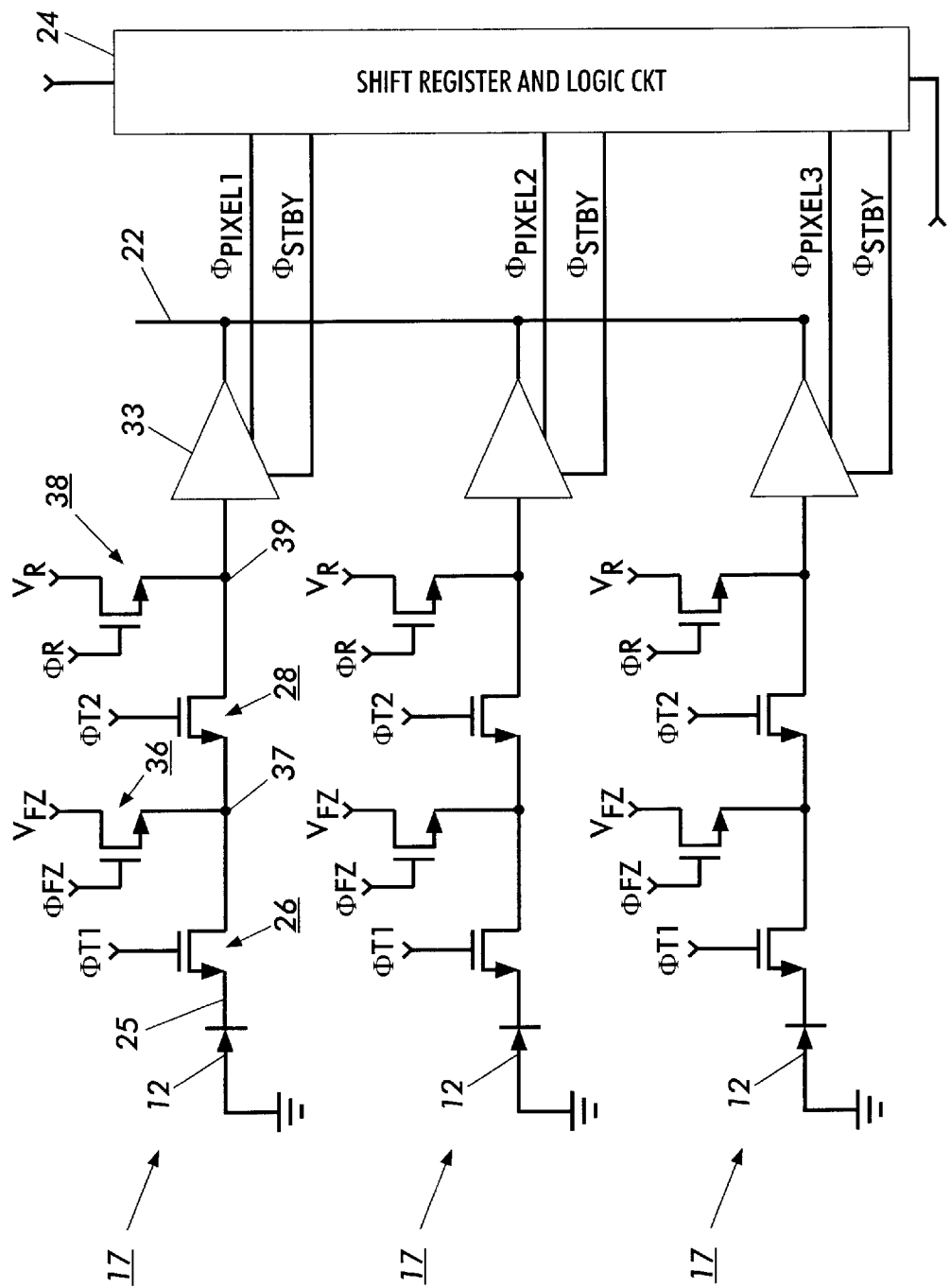
FIG. 5 is a prior art schematic view depicting a prior art array of photosite cells.
Figure 6:
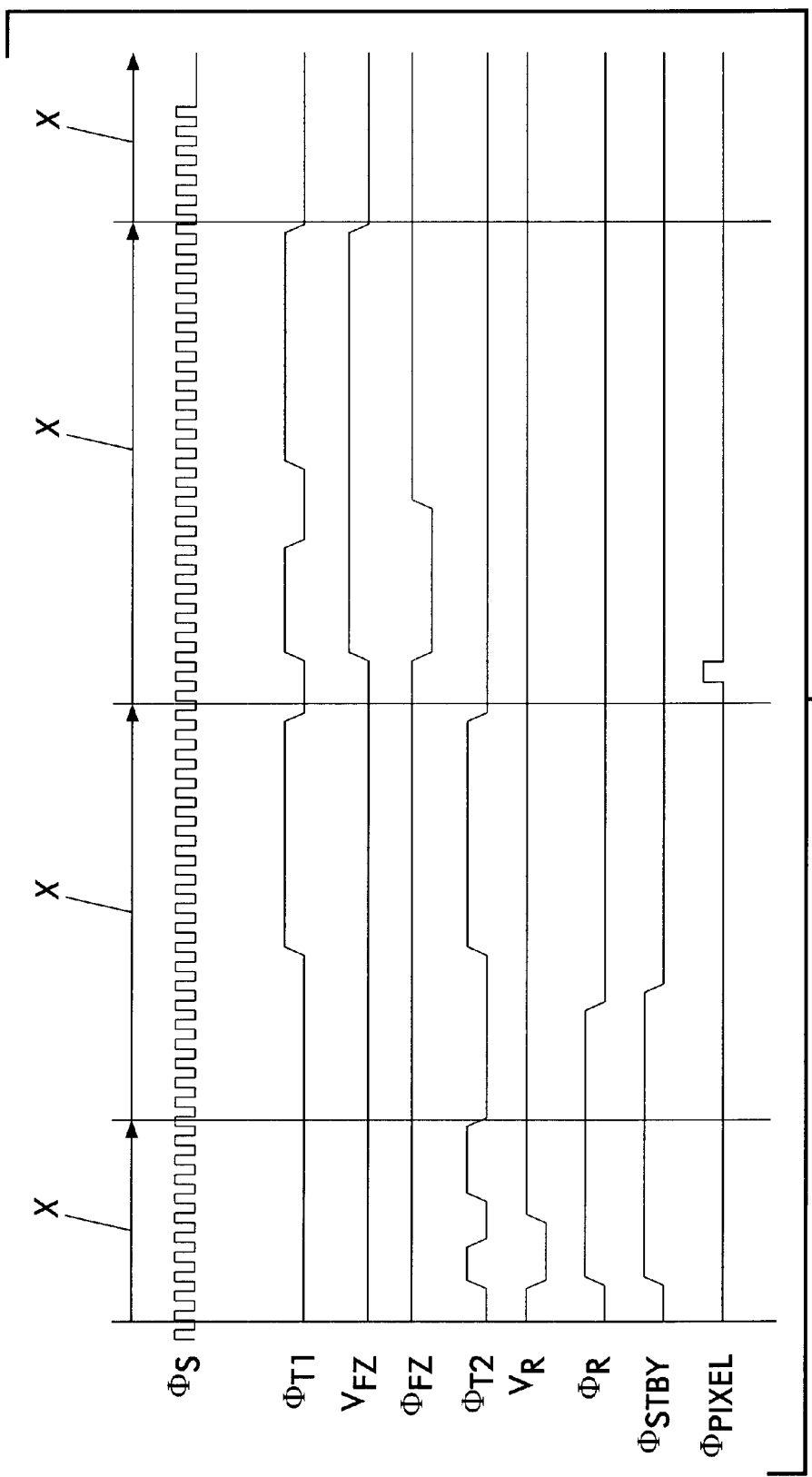
FIG. 6 is a prior art timing diagram showing various voltage pulse waveforms for the transfer circuit in FIGS. 4–5.

Referring particularly to FIGS. 4–6, the two stage transfer circuit 21 associated with each cell 17 has first and second stage transfer transistors 26, 28 for transferring the image signal charge from the photodiode 12 to amplifier 33. Transistors 26, 28 are in series with line 25 connecting one electrode of photodiode 12 with the input gate of amplifier 33. The other electrode of photodiode 12 is grounded.

A bias charge injection transistor 36 is provided to inject a bias charge, for example, an electrical fat zero $V_{FZ}$, to line 25 at middle node 37. Positioning transistor 36 between transistors 26, 28 and selecting the proper clock voltage levels allows transistor 26 to determine the surface potential during both the bias charge injection and charge transfer phases. As a result, the amount of bias charge injected is not dependent on the thresholds of transistors 36 and 26. This eliminates non-uniformities caused by transistor threshold variations from cell to cell while maintaining the high transfer efficiency provided by two stage transfer. A reset transistor 38 controls the reset voltage $V_R$ at the node 39 between transistor 28 and amplifier 33.

A suitable clock source 45 provides pulses $\Phi_R$, $\Phi_{T1}$, $\Phi_{T2}$, $\Phi_{FZ}$, and $V_{FZ}$. Pulses $\Phi_{T1}$, $\Phi_{FZ}$, and $V_{FZ}$ provide for injection of the bias charge into line 25. Pulses $\Phi_{T2}$ and $\Phi_R$ provide for injection of a reset charge at node 37 and injection of the reset voltage $V_R$ at node 39. As will appear, pulses $\Phi_{T1}$ and $\Phi_{T2}$, intended to have different voltage amplitudes, are provided for transferring the image signal charges from photodiodes 12 to amplifiers 33. The $\Phi_{PIXEL}$ signals for multiplexing the amplified charge output by amplifier 33 onto the common video output bus 22 are provided by shift register and logic circuitry 24.

In operation and referring particularly to FIGS. 4–6, pulse $\Phi_R$ actuates reset transistor 38 and $\Phi_{T2}$ actuates transistor 28 to apply a "fill" and "spill" to node 37 with voltage $V_R$. A reset voltage $V_R$ is then applied to node 39 to reset the input to amplifier 33. Subsequently, pulses $\Phi_{T1}$ and $\Phi_{T2}$ actuate transistors 26 and 28 respectively of two stage transfer circuit 20 to transfer the image signal charge accumulated on the photodiodes 12 of each cell 17 to amplifiers 33. Then, to read out the video signals from the various amplifiers 33 onto the video bus 22 in an orderly manner, signal pulses $\Phi_{PIXEL1}$, $\Phi_{PIXEL2}$, and $\Phi_{PIXEL3}$ activate the respective amplifiers 33 in quick succession.

After the image signal has been transferred to the reset node input of the amplifier 33, the photodiodes 12 can be reset and biased for the next light integration period. This can occur during the readout of the amplifiers. During injection of the bias charge, the $\Phi_{T1}$ and $\Phi_{FZ}$ pulses go high while pulse $V_{FZ}$ goes low for the "fill" of the photodiode 12, and then $V_{FZ}$ goes high for the "spill" of the photodiode 12. Following preset intervals, the "spill" is complete and pulses $\Phi_{T1}$ and $\Phi_{FZ}$ return to their nominal level.

The purpose of the standby line is to facilitate, with each scan cycle of the amplifier 33, a reset period for the amplifier 33 itself, in which a relatively small standby current $\Phi_{STBY}$ allows the amplifier 33 to reset to known starting values in preparation for accepting and amplifying the next pixel signal from node 39. All of the important nodes of all amplifiers 33 in the array may be reset at once. However, each amplifier 33 can have slightly different transistor thresholds, which cause random offset in each amplifier 33. This is due to normal semiconductor processing effects.

In order to solve this problem, the prior art used correlated double sampling (CDS) or double sampling (DS) as discussed previously. However, this requires at least double the pixel read out time. The pixel read out time is the amount of time it takes to serially read the pixel information for all pixels in the sensor array. The signal is read from the reset node, where it is temporarily stored after transfer from the photodiodes. Correlated double sampling or double sampling readout time for each pixel includes the readout of the signal and then a second readout of the correlated reference level. Therefore, there is a substantial decline in chip rate speed.

Figure 7:
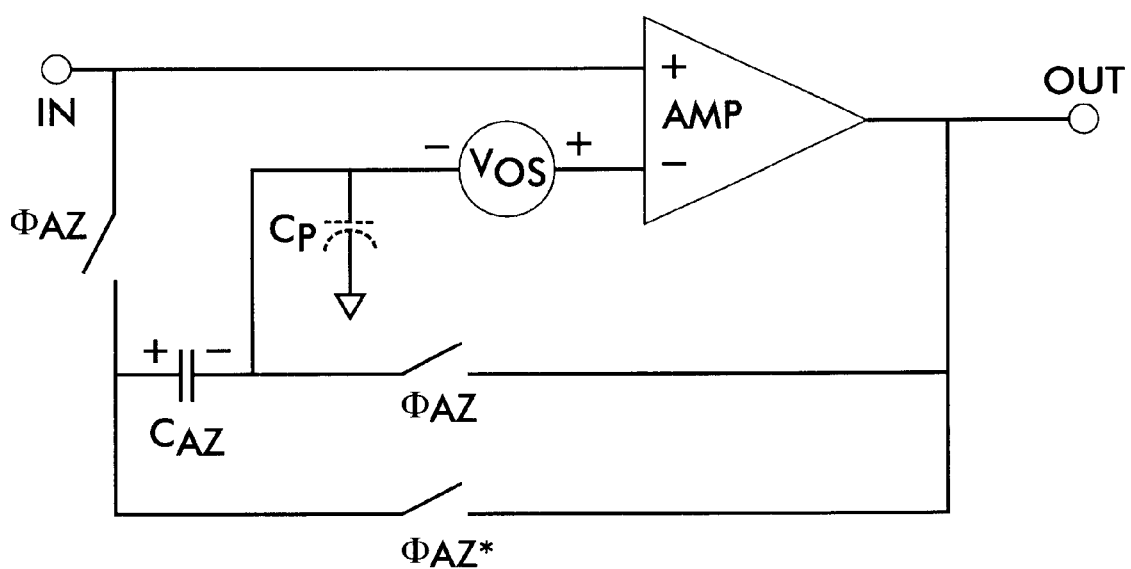
FIG. 7 is a schematic diagram of a basic autozero circuit.

One solution would be to autozero an amplifier at high power before initiating pixel read out. FIG. 7 is a prior art figure, which is used to show the autozeroing of a basic amplifier circuit. FIG. 7 shows a simplified amplifier with infinite gain and one offset voltage, $V_{OS}$. $C_P$ refers to the parasitic input capacitance. When the $\phi_{AZ}$ clock is pulsed high, the $\phi_{AZ}$ switches are closed or shorted, and the $\phi_{AZ}$* switches are open. During this autozero period, the input is driven by a voltage source, and the infinite gain of the amplifier forces a voltage equal to $V_{OS}$ across $C_{AZ}$. This is true because if the gain of an amplifier is infinite, the difference between the inverting and non-inverting inputs must be zero. The sum of the voltage across the capacitor and the random $V_{OS}$ now cancel. Therefore when the $\phi_{AZ}$ clock is pulsed low, the amplifier will now be in its normal unity gain mode of operation without any effective offset on the inverting input. $V_{OS}$ has been autozeroed out of the amplifier.

The problem with performing an autozero at high power is that autozeroing all the amplifiers at high power at the same time consumes too much power and produces power supply transients. If the amplifiers are autozeroed one at a time during pixel readout, the readout becomes twice as long, just as with CDS, because of the required serial autozero time period. Therefore, there is a need for an amplifier, which compensates for the random offset caused by the normal semiconductor manufacturing techniques, while maintaining chip rate speed and holding down power consumption. The problem and solution provided by the present invention are described in greater detail by referring to FIGS. 8–11.

Figure 8:
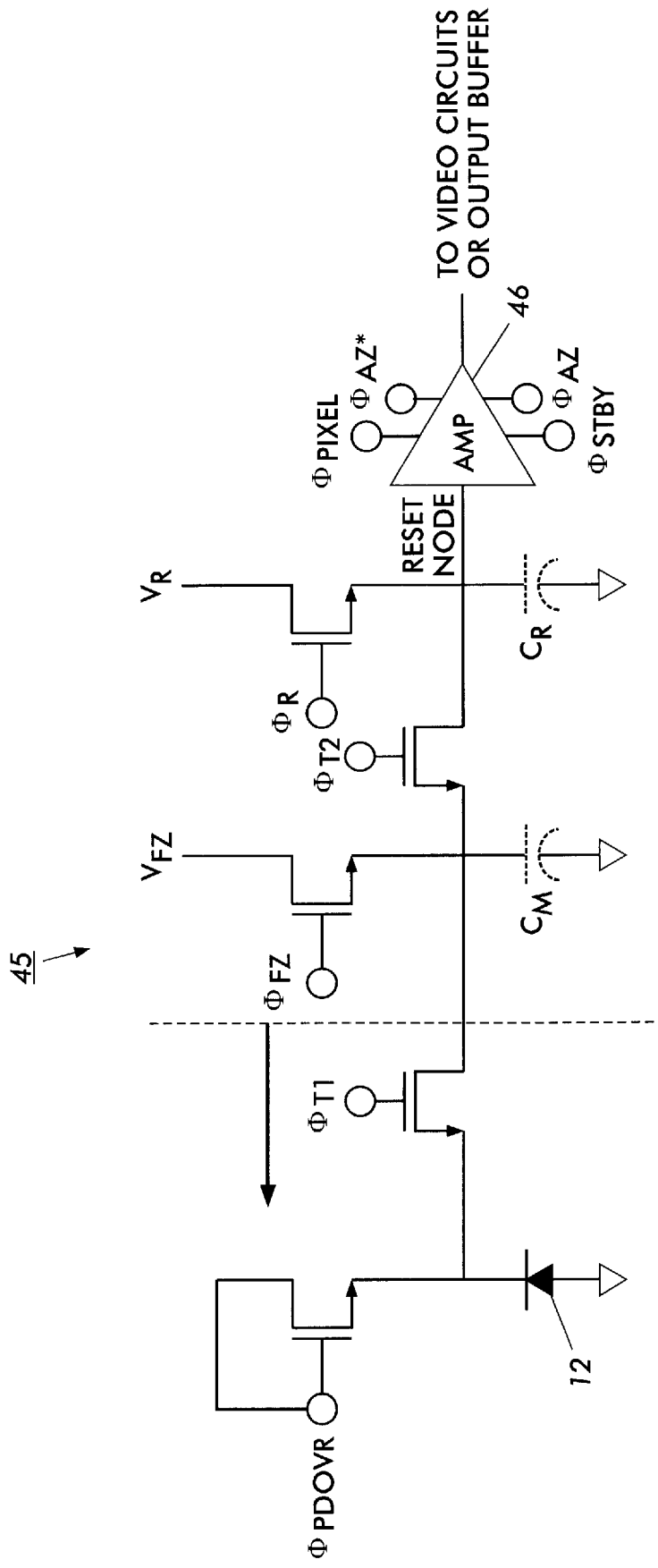
FIG. 8 is a schematic diagram of a photosite cell of the present invention.
Figure 9:
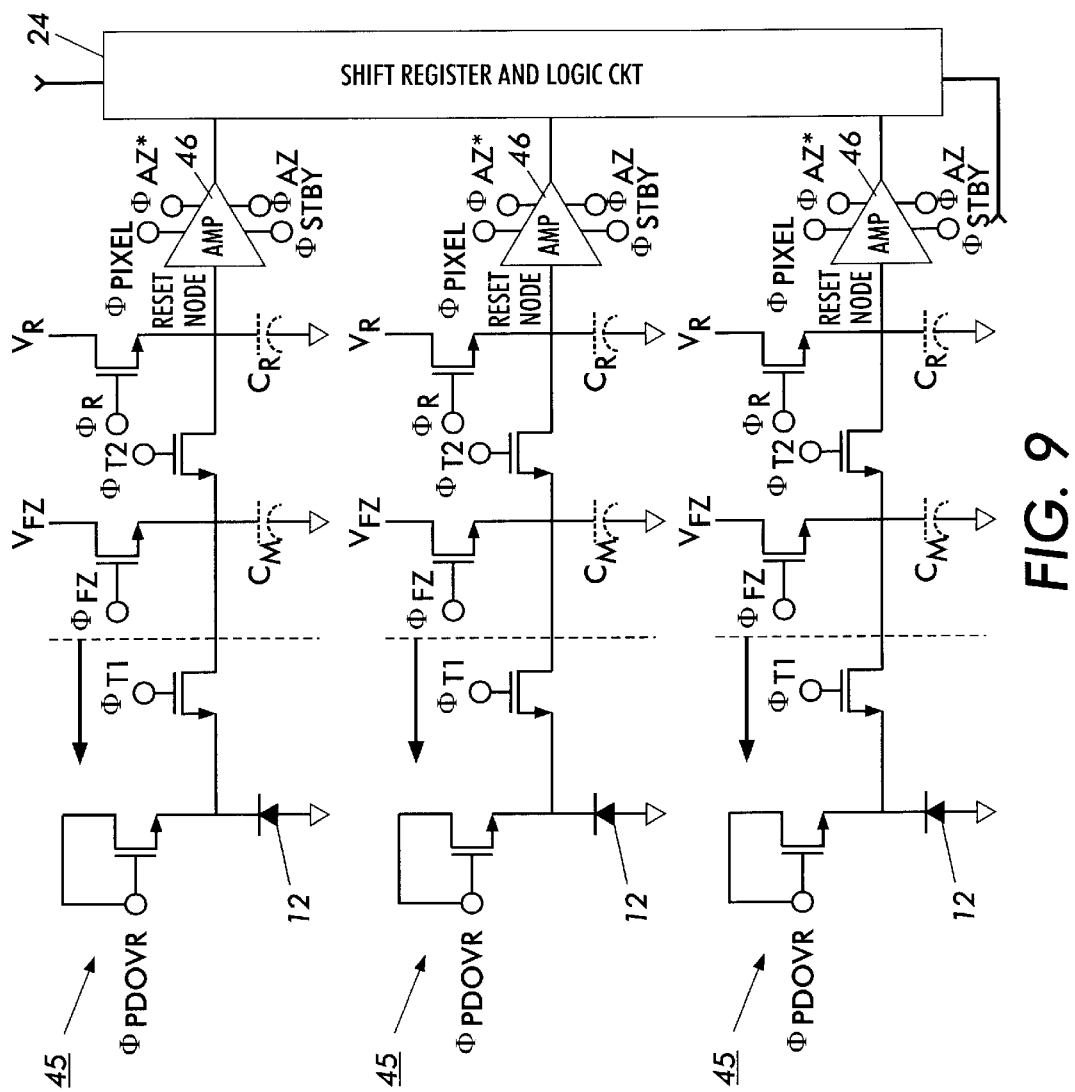
FIG. 9 is a schematic view depicting an array of photosite cells in accordance with the present invention.

FIG. 8 shows a first embodiment of a photosite cell 45 of the present invention, which includes the autozero feature as one of the improvements of the photosite cell 45. By autozeroing a pixel amplifier 46 of the present invention in low power mode and operating the amplifier 46 of the present invention in high power mode, the above mentioned problems of the prior art are solved. FIG. 9 shows a plurality of photosite cells 45 of the present invention to be substituted for the photosite cells 17 shown in prior art FIGS. 4 and 5.

The importance of autozeroing in low power mode is the following. Typically, autozeroing is done serially in time before normal operation (high power mode). For instance, an amplifier is autozeroed, and then charge is transferred to the autozeroed amplifier circuit and the signal is read out without any unwanted offsets. This is acceptable for sensors where there is a significant amount of time to read out an entire row of pixels in parallel, to a row of autozeroing column amplifiers. The autozeroing and charge transfer can be completed by the time it takes to serially read out the entire previous row of photosites. A separate higher power column amplifier, or a differential pair of amplifiers, is used for the fast serial pixel rate readout. However, the readout rate of this amplifier is still cut in half by the double sampling (DS) that still needs to be done to remove column fixed pattern noise induced by this last amplifier stage. An alternative to slowing the data rate down is autozeroing or DS one pixel amplifier during the period before or after that amplifier is being read out, which means two amplifiers must be fully powered at the same time. This is similar to the concept of multiplexing every n pixels, and running them all at a slower rate. For a given data rate, the power is increased by more pixel amplifiers being on at the same time.

In the present invention, the autozeroing of the pixel amplifiers 46 are performed at low power, and the pixels can be read out at full speed from the amplifiers at high power, so that the above mentioned wasted power and extra circuitry is avoided. Pixel amplifiers 46 that have inputs that are floating reset nodes, for charge to voltage conversion, need to be reset in some way when they are powered to an "off" state, to remove lag. $C_R$ refers to the reset node capacitance and $C_M$ refers to the middle node parasitic capacitance. (Please elaborate on these two items.)

Figure 10:
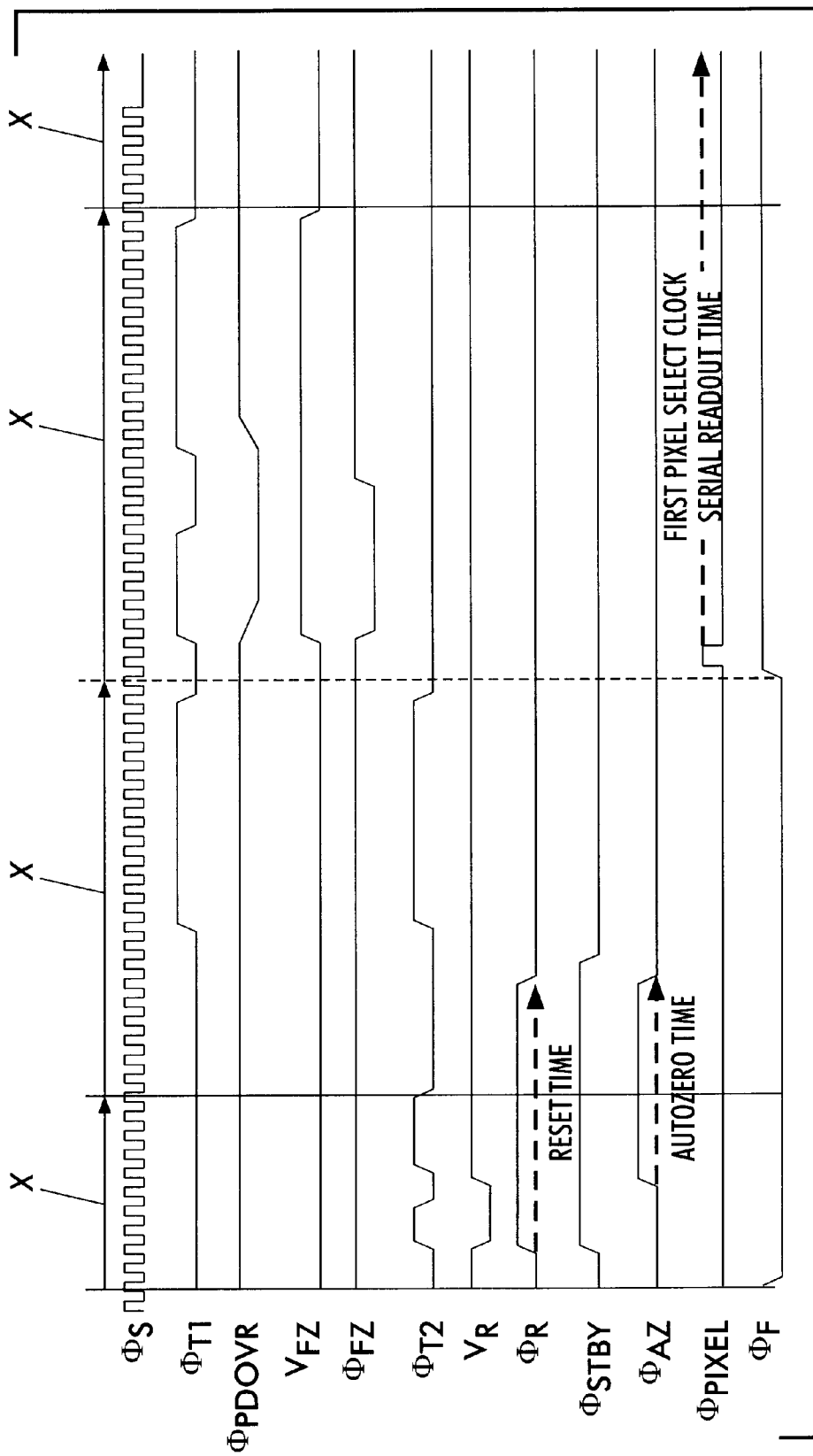
FIG. 10 is a timing diagram showing various voltage pulse waveforms for the transfer circuit of FIGS. 8–9.

A portion of this reset period can be used for autozero as is shown in FIG. 10. While $V_R$ is being reset (by $\phi_R$ high) on the input of all amplifiers 46 turned on at low power by $\phi_{STBY}$, the autozero clock, $\phi_{AZ}$, is enabled for enough time for the amplifier 46 to settle with the correction voltage on the autozero capacitor $C_{AZ}$. When $\phi_{AZ}$ is disabled, the correction voltage is locked on the autozero capacitor $C_{AZ}$. This will remove the offset later during the normal high power serial read out time, shown in the clocking scheme. Therefore autozero can be done without increasing power at all, and without slowing down the serial readout of the pixels.

Figure 11:
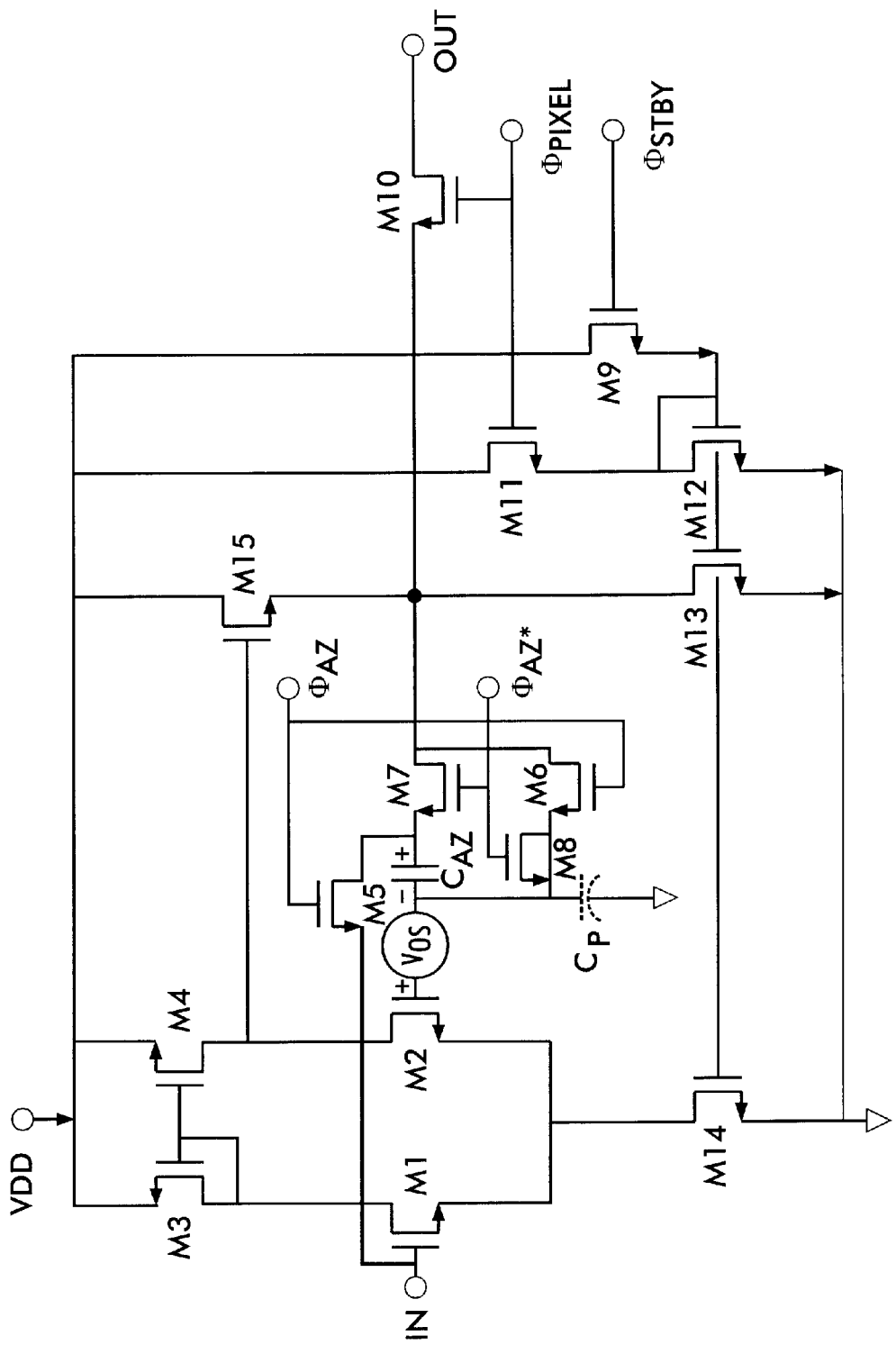
FIG. 11 is a schematic view depicting a pixel amplifier of the present invention.

FIG. 11 shows a more detailed diagram of amplifier 46 of the present invention. The circuit elements of FIG. 11 perform the following functions. M9, M11, and M12 are transistors used to establish a reference current source for the rest of the circuit in FIG. 11. During normal high power operation, when φPixel is high, M11 and M12 establish a current that is mirrored in M13 and M14 by the ratio of the device sizes. M14 is the current source for the first stage of the amplifier, the differential input consisting of M1–M4 & M14. M13 is the current source for the second stage of the amplifier, the source follower consisting of M13 & M15. During low power or standby operation, $\phi_{STBY}$ is high and M9 and M12 establish the reference current for M13 and M14, in the same manner. M10 connects the selected amplifier out to a common line shared by all amplifiers, as $\phi_{Pixel}$ is sequentially powered on for each amplifier. M5 and M6 perform the function of the $\phi_{AZ}$ switches shown in FIG. 7. M7 performs the function of the $\phi_{AZ^*}$ switch shown in FIG. 7. The M8 device is a dummy switch added to balance the Gate-Source overlap capacitive coupling of the M6 device. M5 through M7 are referred to as autozeroing transistors. M1 and M2 are the input differential pair and M3 and M4 are the matched load pair.

However, autozeroing at low power will not generally remove all offsets at higher power operation unless a few additional enhancements are made. The reason for this is that autozero correction capacitor, $C_{AZ}$, corrects the voltage at the inverting input. This correction would be sufficient if random offsets were only caused by process differences in the matched input differential pair, M1 and M2 of FIG. 11. However, there can also be random mismatches in the matched load pair, M3 and M4. The offsets due to M3 and M4 are removed at low power, but will not necessarily be removed at higher power operation of the amplifier 46 due to the different voltage dependence of current in CMOS devices, near the subthreshold region (low current). Since the current is equal in M4 and M2, it can be shown that an offset in the threshold of M4 will only have the same effect as an offset in the threshold of M2 at all currents, only if the $C_{OX}'\mu_0 \times W/L$ of the two devices match. $C_{OX}'$ refers to gate oxide capacitance per unit area; $\mu_0$ refers to the surface mobility of the carrier; W refers to width of the device gate; and L refers to the length of the device gate. Therefore, this low power autozero will only remove all differential offsets if the sizes of the different devices are picked so that the "on" voltages, $V_{GS}-V_T$, are the same, especially if the devices operate near subthreshold.

$$I_N = C_{OXN}' \mu_{oN} \times W_N/L_N/2 \times (V_{GSN}-V_{TN}-V_{OSN})^2, \text{ or in subthreshold}$$
$$I_N = I_{ON} \times \exp^{(VGSN-VTN-VOSN)/nkT}$$

wherein $I_N$ refers to the drain current of N channel MOSFET device; $I_{ON}$ is the subthreshold current when $V_{GSN}=V_{TN}+V_{OSN}$; the subscript N on all parameters indicate an N channel device; $C_{OXN}'$ refers to the per unit area gate oxide capacitance; $\mu_{oN}$ is the electron mobility; $W_N$ is the gate width; $L_N$ is the gate length; $V_{GSN}$ is the gate to source voltage, $V_{TN}$ is the threshold of the device, and $V_{OSN}$ is the random threshold offset voltage on a given device.

If $C_{OX}'\mu_0 \times W/L$ matches in M1–M4, then the nominal $V_{GS}-V_{TO}$ will be equal for all devices at the same current, no matter what level of current. This means that the devices will come out of subthreshold at the same time and will see the same change in voltage dependence with current.

There are a few other considerations with this scheme. The gain of the amplifier 46 is infinite and so a small residual amount of the offset will not be cancelled by autozero. However, for most two stage or higher order amplifiers, the open loop gain, $A_V$, is at least 50 or more. This will result in only 2% of uncompensated offset after autozero, which is excellent. The autozero capacitor, $C_{AZ}$, should be chosen to be relatively large compared to parasitic input capacitance, $C_P$, at the inverting input since these two capacitors will result in a slight gain factor, and also another small residual amount of uncompensated offset. The gain of the amplifier will be increased by 2-$A_{AZ}$, and the uncompensated offset will be $(1-A_{AZ}) \times V_{OS}$, where $A_{AZ}=C_{AZ}/(C_{AZ}+C_P)$. If $C_{AZ}$ is chosen to be about 0.5 pF or larger, the $A_{AZ}$ factor can be kept above 0.98. $A_{AZ}$ is just a temporary variable, as already defined, and happens to be the transfer characteristic of the two series capacitors.

There are many variations of this scheme that are possible. The amplifier 46 could have any number of stages and the input differential pair could be N or P type CMOS devices. It is also possible to use this scheme of low power autozero with bipolar amplifiers.

Figure 12:
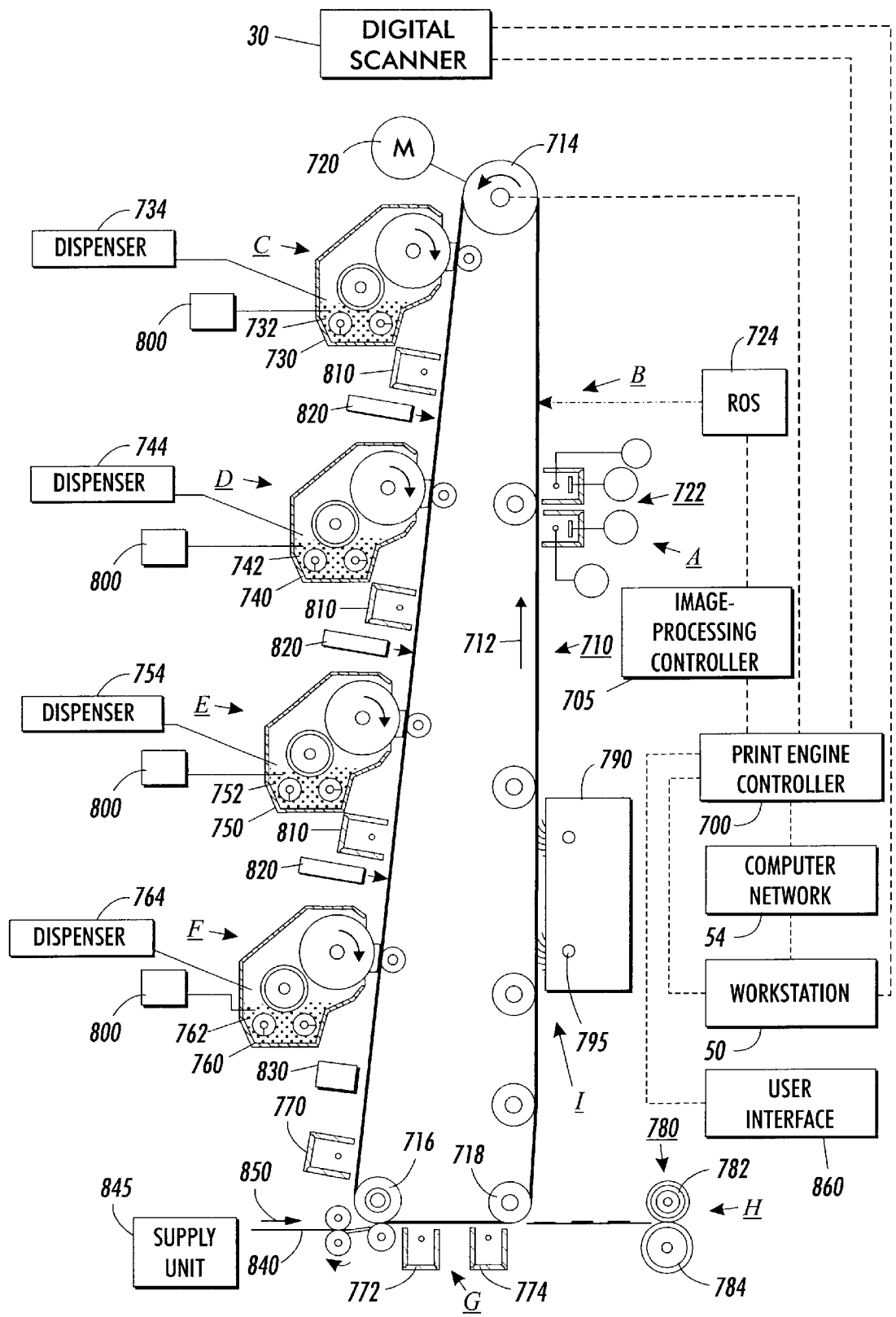
FIG. 12 is a partial schematic elevational view of an example of a print engine of a digital imaging system coupled to a work station, which is coupled to a digital scanner, which can employ the full width array of the present invention including the pixel amplifiers of the present invention.

FIG. 12 is a partial schematic view of a print engine of a digital imaging system coupled to a workstation 50, which is coupled to a digital scanner 30 having the full width array of the present invention including the amplifiers of the present invention. The digital scanner 30 and workstation 50 could be coupled to any type of printer, print engine or computer network. The digital imaging system shown in FIG. 12 is provided as an example. The imaging system is used to produce color output in a single pass of a photoreceptor belt. It will be understood, however, that it is not intended to limit the invention to the embodiment disclosed. On the contrary, it is intended to cover all alternatives, modifications and equivalents as may be included within the spirit and scope of the invention as defined by the appended claims, including a multiple pass color process system, a single or multiple pass highlight color system and a black and white printing system.

In one embodiment, the digital scanner 30 including the full width array of the present invention captures the original document (images) and converts it to digital data. This information is transmitted to an electronic subsystem (ESS) or print engine controller 700. Alternatively, digital scanner 30 captures the original document and converts it to digital data, and transmits the digital data to the workstation 50. The workstation 50 supplies the digital data to print engine controller 700. Alternatively, image signals may be supplied by a computer network 54 to print engine controller 700 by way of a workstation 50. An image-processing controller 705 receives the document information from the print engine controller 700 and converts this document information into electrical signals for the raster output scanner.

Modem scanners connected to copiers, printers, computers, networks, facsimile machines, etc. are capable of scanning and producing complex and interesting page images. The pages may include text, graphics, and scanned or computer-generated images. The image of a page may be described as a collection of simple image components or primitives (characters, lines, bitmaps, colors, etc.). Complex pages can then be built by specifying a large number of the basic image primitives. This is done in software using a page description language such as PostScript. The job of the electronic printer's software is to receive and interpret each of the imaging primitives for the page. The drawing or rasterization must be done on an internal, electronic model of the page. All image components must be collected and the final page image must be assembled before marking can begin. The electronic model of the page is often constructed in a data structure called an image buffer. The data contained is in the form of an array of color values called pixels. Each actual page and the pixel's value give the color, which should be used when marking. The pixels are organized to reflect the geometric relation of their corresponding spots. They are usually ordered to provide easy access in the raster pattern required for marking.

The printing machine preferably uses a charge retentive surface in the form of an Active Matrix (AMAT) photoreceptor belt 710 supported for movement in the direction indicated by arrow 712, for advancing sequentially through the various xerographic process stations. The photoreceptor belt 710 is entrained about a drive roller 714, tension rollers 716 and fixed roller 718 and the drive roller 714 is operatively connected to a drive motor 720 for effecting movement of the photoreceptor belt 710 through the xerographic stations. A portion of photoreceptor belt 710 passes through charging station A where a corona generating device, indicated generally by the reference numeral 722, charges the photoconductive surface of photoreceptor belt 710 to a relatively high, substantially uniform, preferably negative potential.

Next, the charged portion of photoconductive surface is advanced through an imaging/exposure station B. At imaging/exposure station B, the print engine controller 700 receives the image signals representing the desired output image from the digital scanner 30 directly, computer network 54, or work station 50 and processes these signals to convert them to the various color separations of the image. The desired output image is transmitted to a laser based output scanning device, which causes the charge retentive surface to be discharged in accordance with the output from the scanning device. Preferably the laser based scanning device is a laser Raster Output Scanner (ROS) 724. Alternatively, the ROS 724 could be replaced by other xerographic exposure devices such as an LED array.

The photoreceptor belt 710, which is initially charged to a voltage $V_0$, undergoes dark decay to a level equal to about −500 volts. When exposed at the exposure station B, it is discharged to a level equal to about −50 volts. Thus after exposure, the photoreceptor belt 710 contains a monopolar voltage profile of high and low voltages, the former corresponding to charged areas and the latter corresponding to discharged or background areas.

At a first development station C, the development station C preferably utilizes a hybrid development system including a developer structure 730. The development roll, better known as the donor roll, is powered by two development fields (potentials across an air gap). The first field is the ac field which is used for toner cloud generation. The second field is the dc development field which is used to control the amount of developed toner mass on the photoreceptor belt 710. The developer structure 730 contains magenta toner particles 732. The toner cloud causes charged magenta toner particles 732 to be attracted to the electrostatic latent image. Appropriate developer biasing is accomplished via a power supply (not shown). This type of system is a noncontact type in which only toner particles (magenta, for example) are attracted to the latent image and there is no mechanical contact between the photoreceptor belt 710 and a toner delivery device to disturb a previously developed, but unfixed, image. A toner concentration sensor 800 senses the toner concentration in the developer structure 730. A dispenser 734 dispenses magenta toner into the developer structure 730 to maintain a proper toner concentration. The dispenser 734 is controlled by print engine controller 700.

The developed but unfixed image is then transported past a second charging device 810 where the photoreceptor belt 710 and previously developed toner image areas are recharged to a predetermined level.

A second exposure/imaging is performed by device 820 which preferably comprises a laser based output structure. The device 820 is utilized for selectively discharging the photoreceptor belt 710 on toned areas and/or bare areas, pursuant to the image to be developed with the second color toner. Device 820 may be a raster output scanner or LED bar, which is controlled by print engine controller 700. At this point, the photoreceptor belt 710 contains toned and untoned areas at relatively high voltage levels and toned and untoned areas at relatively low voltage levels. These low voltage areas represent image areas which are developed using discharged area development (DAD). To this end, a negatively charged, developer material 742 comprising the second color toner, preferably yellow, is employed. The second color toner is contained in a developer structure 740 disposed at a second developer station D and is presented to the latent images on the photoreceptor belt 710 by way of a second developer system. A power supply (not shown) serves to electrically bias the developer structure 740 to a level effective to develop the discharged image areas with negatively charged yellow toner particles 742. Further, a toner concentration sensor 800 senses the toner concentration in the developer structure 740. A dispenser 744 dispenses magenta toner into the developer structure 740 to maintain a proper toner concentration. The dispenser 744 is controlled by print engine controller 700.

The above procedure is repeated for a third image for a third suitable color toner such as cyan 752 contained in developer structure 750 and dispenser 754 (station E), and for a fourth image and suitable color toner such as black 762 contained in developer structure 760 and dispenser 764 (station F). Preferably, developer structures 730, 740, 750 and 760 are the same or similar in structure. Also, preferably, the dispensers 734, 744, 754 and 764 are the same or similar in structure. The exposure control scheme described below may be utilized for these subsequent imaging steps. In this manner a full color composite toner image is developed on the photoreceptor belt 710. In addition, a permeability sensor 830 measures developed mass per unit area (developability). Although only one sensor 830 is shown in FIG. 12, there may be more than one sensor 830.

To the extent to which some toner charge is totally neutralized, or the polarity reversed, thereby causing the composite image developed on the photoreceptor belt 710 to consist of both positive and negative toner, a negative pre-transfer dicorotron member 770 is provided to condition all of the toner for effective transfer to a substrate.

Subsequent to image development a sheet of support material 840 is moved into contact with the toner images at transfer station G. The sheet of support material 840 is advanced to transfer station G by the supply unit 845 in the direction of arrow 850. The sheet of support material 840 is then brought into contact with photoconductive surface of photoreceptor belt 710 in a timed sequence so that the toner powder image developed thereon contacts the advancing sheet of support material 840 at transfer station G.

Transfer station G includes a transfer dicorotron 772 which sprays positive ions onto the backside of support material 840. This attracts the negatively charged toner powder images from the photoreceptor belt 710 to support material 840. A detack dicorotron 774 is provided for facilitating stripping of the sheets from the photoreceptor belt 710.

After transfer, the sheet of support material 840 continues to move onto a conveyor (not shown) which advances the sheet to fusing station H. Fusing station H includes a fuser assembly, indicated generally by the reference numeral 780, which permanently affixes the transferred powder image to support material 840. Preferably, fuser assembly 780 comprises a heated fuser roller 782 and a backup or pressure roller 784. Support material 840 passes between fuser roller 782 and backup roller 784 with the toner powder image contacting fuser roller 782. In this manner, the toner powder images are permanently affixed to support material 840. After fusing, a chute, not shown, guides the advancing sheets 28 to a catch tray, stacker, finisher or other output device (not shown), for subsequent removal from the printing machine by the operator.

After the sheet of support material 840 is separated from photoconductive surface of photoreceptor belt 710, the residual toner particles carried by the non-image areas on the photoconductive surface are removed therefrom. These particles are removed at cleaning station I using a cleaning brush or plural brush structure contained in a housing 790. The cleaning brush 795 or brushes 795 are engaged after the composite toner image is transferred to a sheet. Once the photoreceptor belt 710 is cleaned the brushes 795 are retracted utilizing a device incorporating a clutch (not shown) so that the next imaging and development cycle can begin.

Print engine controller 700 regulates the various printer functions. The print engine controller 700 preferably includes one or more programmable controllers, which control printer functions hereinbefore described. The print engine controller 700 may also provide a comparison count of the copy sheets, the number of documents being recirculated, the number of copy sheets selected by the operator, time delays, jam corrections, etc. The control of all of the exemplary systems heretofore described may be accomplished automatically, through the use of user interface 860 from the printing machine consoles selected by an operator, or through the use of a workstation 50 selected by the operator. Conventional sheet path sensors or switches may be utilized to keep track of the position of the document and the copy sheets.

While FIG. 12 shows an example of a digital imaging systems incorporating the digital scanner 30 including the full width array of the present invention, it is understood that this full width array could be used in any imaging system having any number of developer structures. It should be further understood that this amplifier with the autozeroing capability is not limited to use with a photosensor. It may be used in many different amplifier applications, where autozeroing during low power would be beneficial to the electrical circuitry.

While the invention has been described in detail with reference to specific and preferred embodiments, it will be appreciated that various modifications and variations will be apparent to the artisan. All such modifications and embodiments as may occur to one skilled in the art are intended to be within the scope of the appended claims.

What is claimed is:

1. A photosensor array comprising:
   a plurality of photosites;
   an amplifier associated with each photosite and including a plurality of transistors, wherein the amplifier includes autozeroing transistors for autozeroing at low power to remove voltage offsets in the amplifier; and
   a transfer circuit associated with each photosite for transferring a charge on the photosite to a reset node interposed between the photosite and amplifier.

2. The photosensor array of claim 1, wherein the photosites are photodiodes.

3. The photosensor array of claim 1, wherein the photosensor array is a linear array of photosites.

4. The photosensor array of claim 1, wherein the photosensor array comprises multiple parallel linear arrays of photosites.

5. The photosensor array of claim 1, wherein the amplifier includes a differential pair of transistors and a matched load pair of transistors, wherein the differential pair of transistors and the matched load of transistors operate at the same $V_{GSN} - V_{TN}$.

6. The photosensor array of claim 1, wherein the amplifier includes a dummy transistor associated with the autozeroing transistors, wherein the dummy transistor compensates the autozeroing transistors.

7. The photosensor array of claim 1, wherein the amplifier is autozeroed during a reset time.

8. The photosensor array of claim 1, wherein the transistors of the amplifier comprise one of CMOS or Bipolar.

9. The photosensor array of claim 1, wherein the photosensor array further comprises means for selectively causing the amplifier to output a charge from the reset node as an output signal.

10. A digital imaging system for generating an image from output image signals comprising:
    a photoreceptor;
    a plurality of charging units charging the photoreceptor;
    a plurality of exposure units receiving the image signals and exposing the photoreceptor to place a latent image on the photoreceptor based on the image signals;
    a scanner for scanning the images, generating the output image signals and transmitting the output image signals to the exposure units, wherein the scanner includes a photosensor array having a plurality of photosites, each photosite being associated with an amplifier, which includes autozeroing transistors for autozeroing at low power to remove voltage offsets in the amplifier; each photosite being associated with a transfer circuit for transferring a charge on the photosite to a reset node interposed between the photosite and amplifier; and each photosite being associated with a means for selectively causing the amplifier to output a charge from the reset node as output image signals;
    a plurality of developer structures, each developer structure being connected to a corresponding dispenser, each dispenser having a different toner, and each developer structure applying toner to the photoreceptor;
    a transfer unit transferring the toner on the photoreceptor to a support material;
    a fusing unit fusing the toner to the support material; and
    a cleaner cleaning the photoreceptor after the support material has passed through the transfer unit.

11. The digital imaging system as in claim 10, wherein the photosites are photodiodes.

12. A method of operating an amplifier at low power mode for removing voltage offsets in the amplifier, comprising the steps of:
    applying a reference voltage to the input node of the amplifier to prepare the amplifier for voltage offset removal;

selecting the low power mode;

autozeroing the amplifier at low power mode by selecting the autozero clock;

deselecting the autozero clock while the reference voltage is still at the input node and the amplifier is in the low power mode;

applying a signal to the input node of the amplifier; and selecting the high power mode of the amplifier and read out the signal without voltage offset.

* * * * *